May 25, 1926.  W. H. SCHULZE  1,585,793
AUTOMOBILE BUMPER
Filed August 24, 1925
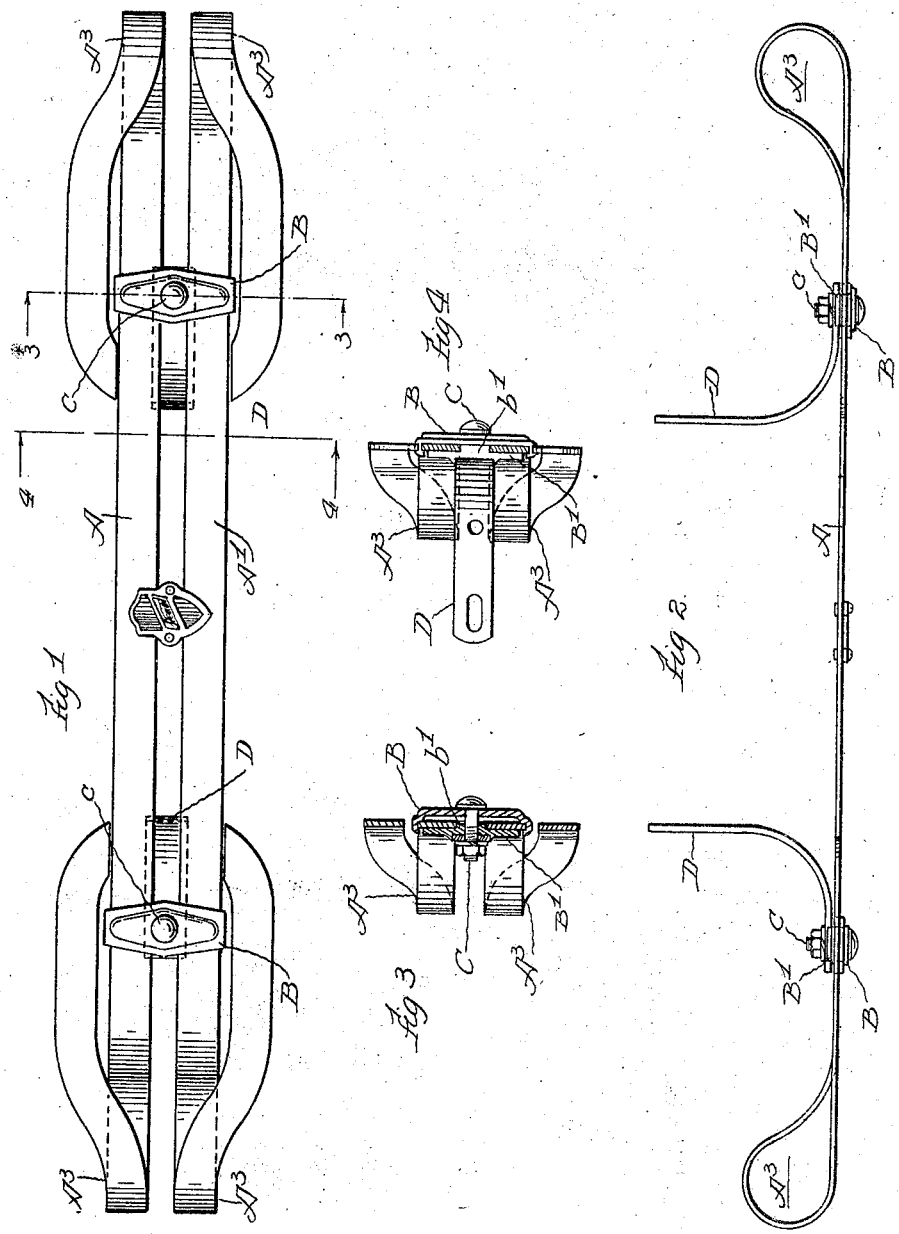
Witness.
N. D. McKnight.
Inventor.
William H. Schulze.
by Burton & Burton
his Attorneys.

Patented May 25, 1926.

1,585,793

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE BUMPER.

Application filed August 24, 1925. Serial No. 51,931.

The purpose of this invention is to provide an improved construction of a bumper for automobiles. It consists in the elements and features of construction shown and described as indicated in the claims.

In the drawings:

Figure 1 is a front elevation of a bumper embodying this invention.

Figure 2 is a plan view of the same.

Figure 3 is a section at the line 3—3 on Figure 1.

Figure 4 is a section at the line 4—4 on Figure 1.

It is a matter of experience that by far the larger number of collisions or impacts with an automobile bumper are at the end portions, outwardly beyond the points of support of the impact member as in meeting and passing other vehicles, turning to avoid fixed obstacles and like movements. It is also a matter of experience that the collisions and impacts experienced by the bumper at the middle portion between the supports must be cushioned chiefly by the yielding resistance of the supports to the action of the impact members tending to flex the supports toward each other as the impact member itself is flexed rearward by the impact of the colliding body. It is also a matter of experience that collisions with the middle portion of the bumper commonly termed "head-on collisions" occur by encounter either with a fixed obstacle such as posts, or a portion of another vehicle having considerable vertical extent, as for example, the rear wheel, so that vertical width of the impact member at the middle, to adapt it to guard the vehicle over a considerable vertically extended area is not especially important, and that a comparatively narrow vertical extent of the bumper at the middle part serves all purposes; whereas the collisions experienced at the end portions of the bumper are most likely to be with vertically narrow objects such as the bumpers of other cars, and for this reason a considerable vertically extended area of protection is desirable at the portion of the bumper in the longitudinal zone of the supports and laterally thereof.

It is also a matter of experience that the value of the end portions of the bumper outward from its point of support consists largely in its adaptation to spring and slip clear of obstacles encountered by the end of the bumper as in making a turn around a post or driving in or out of a garage where there is liability of the bumper to encounter the stanchions or snubbing posts which guard the entrance.

The bumper shown in the drawings and constituting this invention is designed in view of these experiences and the requirements which they indicate for bumpers for practical road service, as will appear in further detailed description of the structure shown.

The drawings show a bumper comprising two impact bars, A and A¹, which, at their middle portion and in general through their corresponding portions, are positioned vertically edgewise in the same vertical plane and spaced apart a limited distance,—preferably less than the width of either bar,—in that plane. These two bars are secured together by transversely extending clamps each comprising a front member, B, and a rear member, B¹, between which the bars are gripped and clamped and securely held in parallel spaced relation to each other as stated. One of the two clamp members, and most conveniently the rear member, B¹, has at the middle portion of its vertical extent a boss, b¹, dimensioned for extending between the two bars and thereby spacing them apart the desired limited distance. A bolt, C, for securing the two clamp members together and clamping the impact bars between them extends through this middle boss of the rear member. In the particular construction shown the impact member is designed to be supported on the vehicle by two similar flat spring bar supports, D, D, adapted at their rear ends for attachment to the vehicle as indicated by bolt apertures, and extending horizontally forward and flexed outward so as to terminate at their forward ends substantially at right angles to their rear end portions and lap said transversely extending forward ends on the clamps which secure the impact bars together, said ends being attached directly to the clamps by the bolts, C, which secure the clamp members together for clamping the impact bars. Outwardly from the clamps each of the impact bars, A and A¹, is flexed forwardly and then inwardly to form end loops, A³, A³, of like dimensions, so that the loop of the upper bar directly overhangs the loop of the lower bar. Beside being flexed horizontally as described the end portions of the bars inward from the loops are flexed rearward and edgewise vertically, the upper bar being flexed upwardly and the lower bar downwardly in the same vertical plane, so that the inwardly extending end portions of both bars stand and extend inwardly substantially in the vertical plane of the body of the bars, the edgewise flexure being somewhat greater than the width of the bars, so that the end portions extending as stated in the vertical plane of the bars and extending inwardly beyond the clamps, extend respectively above and below the ends of the clamps as seen clearly in Figure 1. These inwardly extending end portions of both bars terminate free and unattached in the vertical plane of the body of the bars as stated, and spaced at the ends sufficiently above and below the upper and lower bars respectively, so that in the case of impact with these end portions they are not stopped by encounter with the body of the bar, but are free to be sprung out of their vertical plane and the plane of the bars either forwardly or rearwardly.

It will be understood from the foregoing description that the loop ends or bends of both bars, presenting rounded surfaces, both rearwardly and forwardly, and being free to spring to the extent of their elasticity, either forwardly or rearwardly, are adapted to spring clear of obstacles which may be encountered in movement of the vehicle in either direction. And it will be noticed that by reason of the inwardly extending end portions of the loops being entirely free, the springing of the loops in either horizontal direction is effected against the stiffness of only one side of the loop, namely, the side which extends from the clamp toward the loop; and this is one purpose of the construction as described, in which, as mentioned, the ends are positioned clear of the body of the bars, so that they are not driven into contact with the bars and stopped thereby when the loop bends encounter an obstacle or are encountered by a moving body so as to be sprung either rearward or forward. It will also be observed that the edgewise flexure of the inwardly extending ends bringing them into the vertical plane of the body of the bars and above and below the same, affords a vertically wide area of protection in respect to impact at the longitudinal zones at which such impacts are most frequent and injurious; while the middle portion of the length of the impact member is limited in its vertical extent to the width of the two bars and their interspace, thus obtaining the vertical width of protection over the portion where it is required, without increasing the weight of the pumper by extending that width at the portion of the length where it is not required.

I claim:—

1. A bumper for motor vehicles comprising two flat metal bars mounted vertically edgewise in the same plane and slightly spaced apart in that plane rigidly secured together, the opposite end portions of each bar being flexed forwardly and inwardly forming end loops, the inwardly extending portion of each bar being also flexed edgewise, the lower bar downward and the upper bar upward past the horizontal zone of the body of the bar for terminating free and out of range of collision with the body upon impact forwardly or rearwardly.

2. A bumper for motor vehicles comprising two flat metal bars mounted vertically edgewise in the same plane and slightly spaced apart in that plane; ties extending crosswise of said bars and securing them together, the opposite end portions of each bar being flexed forwardly and inwardly forming end loops, the inwardly flexed portion of each bar being also flexed edgewise, the lower bar downward and the upper bar upward at their inwardly extending portions to position said end portions in the vertical plane of the portion of the body of the bar immediately antecedent to the loop portion.

3. A bumper for motor vehicles comprising two flat metal bars mounted vertically edgewise in the same plane and slightly spaced apart in that plane; ties extending crosswise of said bars and securing them together, the opposite end portions of each bar being flexed rearwardly and then forwardly and inwardly forming end loops, the inwardly flexed portion of each bar being also flexed edgewise, the lower bar downward and the upper bar upward at their inwardly extending portions to position said end portions in the vertical plane of the portion of the body of the bar immediately antecedent to the loop portion.

4. In the construction defined in claim 1, foregoing, the edgewise deflected end portions of the impact bars inward from the loop being extended substantially in the vertical plane of the body of the bars.

5. In the construction defined in claim 1, foregoing, ties extending crosswise of the body of the impact bars for securing them rigidly together and means for mounting the impact member as a whole on the vehicle attached to said ties.

6. In the construction defined in claim 1, foregoing, ties extending crosswise of the impact bars for securing them together and means for mounting the impact member as a whole on the vehicle comprising parts adapted to be attached to the vehicle frame and at its forward ends secured to said cross ties, the edgewise deflected end portions of the bar extending inwardly from the loops, being positioned in the vertical plane of the body of the bars and extending inwardly past the cross ties.

In testimony whereof, I have hereunto set my hand at Chicago, Illinois, this 14 day of August, 1925.

WILLIAM H. SCHULZE.